(12) United States Patent
Neighman et al.

(10) Patent No.: US 11,562,360 B2
(45) Date of Patent: Jan. 24, 2023

(54) MOBILE DEVICE PAYMENTS

(71) Applicant: Block, Inc., San Francisco, CA (US)

(72) Inventors: Daniel Neighman, San Francisco, CA (US); Eric Firestone, San Francisco, CA (US); Daniel Spencer, San Francisco, CA (US); Cameron Walters, San Francisco, CA (US); Sophia Huang, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 17/733,962

(22) Filed: Apr. 29, 2022

(65) Prior Publication Data
US 2022/0261808 A1    Aug. 18, 2022

Related U.S. Application Data

(60) Continuation of application No. 16/528,383, filed on Jul. 31, 2019, which is a division of application No.
(Continued)

(51) Int. Cl.
*G06Q 20/20* (2012.01)
*G06Q 20/40* (2012.01)
*G06Q 20/32* (2012.01)

(52) U.S. Cl.
CPC ......... *G06Q 20/4012* (2013.01); *G06Q 20/20* (2013.01); *G06Q 20/322* (2013.01); *G06Q 20/3255* (2013.01); *G06Q 20/4014* (2013.01)

(58) Field of Classification Search
CPC .. G06Q 20/4012; G06Q 20/20; G06Q 20/322; G06Q 20/3255; G06Q 20/4014
(Continued)

(56) References Cited

U.S. PATENT DOCUMENTS

| 5,960,411 A | 9/1999 | Hartman et al. |
| 6,705,520 B1 | 3/2004 | Pitroda et al. |

(Continued)

FOREIGN PATENT DOCUMENTS

| AU | 2017228647 A1 | 10/2017 |
| CA | 2 906 524 A1 | 9/2014 |

(Continued)

OTHER PUBLICATIONS

Notice of Allowance for Canadian Patent Application No. 2,935,177, dated Jan. 22, 2019.
(Continued)

*Primary Examiner* — Russell S Glass
(74) *Attorney, Agent, or Firm* — Lee & Hayes, P.C.

(57) ABSTRACT

Methods, systems, and apparatus, including computer programs encoded on computer storage media, for conducting cardless payment transactions. One of the methods includes receiving, in association with a payment transaction, a message from a customer device that includes data from an optical scan of a code displayed at a merchant point-of-sale. A request to authorize a payment for the payment transaction is received from a merchant computer. Customer and merchant accounts are identified and payment data previously associated with the customer account is accessed. The payment is authorized using the payment data, and notification of authorization is sent to the merchant device or customer device.

20 Claims, 4 Drawing Sheets

Related U.S. Application Data

14/550,382, filed on Nov. 21, 2014, now Pat. No. 10,438,202, which is a division of application No. 13/831,103, filed on Mar. 14, 2013, now Pat. No. 8,924,259.

(58) Field of Classification Search
USPC .......................................................... 705/44
See application file for complete search history.

(56) References Cited

U.S. PATENT DOCUMENTS

| | | | |
|---|---|---|---|
| 6,738,749 | B1 | 5/2004 | Chasko |
| 6,763,399 | B2 | 7/2004 | Margalit et al. |
| 7,069,240 | B2 | 6/2006 | Spero et al. |
| 7,305,129 | B2 | 12/2007 | Chellapilla et al. |
| 8,135,624 | B1 | 3/2012 | Ramalingam et al. |
| 8,346,659 | B1* | 1/2013 | Mohsenzadeh ........ G06Q 20/00 705/37 |
| 8,498,900 | B1 | 7/2013 | Spirin et al. |
| 8,645,222 | B1 | 2/2014 | Tamassia et al. |
| 8,924,259 | B2 | 12/2014 | Neighman et al. |
| 9,037,491 | B1 | 5/2015 | Lee |
| 9,355,391 | B2* | 5/2016 | von Behren ......... G06Q 20/047 |
| 9,626,669 | B2 | 4/2017 | Lee |
| 9,799,021 | B1 | 10/2017 | Lee |
| 9,818,093 | B1 | 11/2017 | Grier |
| 10,185,958 | B2 | 1/2019 | Henderson et al. |
| 10,438,202 | B2 | 10/2019 | Neighman et al. |
| 11,107,056 | B2 | 8/2021 | Lee |
| 2002/0069170 | A1 | 6/2002 | Rizzo et al. |
| 2003/0208386 | A1 | 11/2003 | Brondrup |
| 2003/0212609 | A1 | 11/2003 | Blair et al. |
| 2004/0029569 | A1 | 2/2004 | Khan et al. |
| 2006/0047576 | A1 | 3/2006 | Aaltonen et al. |
| 2007/0069013 | A1 | 3/2007 | Seifert et al. |
| 2008/0040233 | A1 | 2/2008 | Wildman et al. |
| 2008/0041937 | A1 | 2/2008 | Vawter |
| 2008/0126260 | A1 | 5/2008 | Cox et al. |
| 2008/0167961 | A1 | 7/2008 | Wentker et al. |
| 2008/0215475 | A1 | 9/2008 | Ramer et al. |
| 2008/0319869 | A1 | 12/2008 | Carlson et al. |
| 2009/0043696 | A1 | 2/2009 | Ornce et al. |
| 2009/0048936 | A1 | 2/2009 | Lerch et al. |
| 2009/0065571 | A1 | 3/2009 | Jain |
| 2009/0157547 | A1 | 6/2009 | Ruckart |
| 2009/0159663 | A1 | 6/2009 | Mullen et al. |
| 2009/0187466 | A1 | 7/2009 | Carter et al. |
| 2009/0187488 | A1 | 7/2009 | Shamilian |
| 2009/0187492 | A1 | 7/2009 | Hammad et al. |
| 2009/0228325 | A1 | 9/2009 | Simmons et al. |
| 2009/0307140 | A1 | 12/2009 | Mardikar |
| 2009/0313101 | A1 | 12/2009 | McKenna et al. |
| 2009/0327135 | A1 | 12/2009 | Nguyen et al. |
| 2010/0019033 | A1 | 1/2010 | Jolivet |
| 2010/0030651 | A1 | 2/2010 | Matotek et al. |
| 2010/0082445 | A1 | 4/2010 | Hodge et al. |
| 2010/0138344 | A1 | 6/2010 | Wong et al. |
| 2010/0169179 | A1 | 7/2010 | Ramer et al. |
| 2010/0185514 | A1 | 7/2010 | Glazer et al. |
| 2010/0191551 | A1 | 7/2010 | Drance et al. |
| 2010/0293065 | A1 | 11/2010 | Brody et al. |
| 2011/0047075 | A1 | 2/2011 | Fourez |
| 2011/0184822 | A1 | 7/2011 | Matkovic |
| 2011/0307342 | A1 | 12/2011 | Haji |
| 2012/0005076 | A1 | 1/2012 | Dessert et al. |
| 2012/0010938 | A1 | 1/2012 | Standley et al. |
| 2012/0048922 | A1 | 3/2012 | Godager |
| 2012/0072349 | A1 | 3/2012 | Bernstein et al. |
| 2012/0123935 | A1 | 5/2012 | Brudnicki et al. |
| 2012/0143707 | A1 | 6/2012 | Jain |
| 2012/0158580 | A1 | 6/2012 | Eram et al. |
| 2012/0198279 | A1 | 8/2012 | Schroeder |
| 2012/0253852 | A1 | 10/2012 | Pourfallah et al. |
| 2012/0290421 | A1 | 11/2012 | Qawami et al. |
| 2012/0310744 | A1 | 12/2012 | Kim et al. |
| 2012/0331134 | A1 | 12/2012 | Lynn et al. |
| 2013/0080331 | A1 | 3/2013 | Granbery et al. |
| 2013/0144738 | A1 | 6/2013 | Qawami et al. |
| 2013/0198076 | A1 | 8/2013 | Zambelli Hosmer et al. |
| 2013/0218721 | A1 | 8/2013 | Borhan et al. |
| 2013/0295882 | A1 | 11/2013 | Zhao |
| 2014/0012757 | A1* | 1/2014 | Henderson ......... G06Q 30/0185 705/44 |
| 2014/0244489 | A1 | 8/2014 | Kessler et al. |
| 2014/0249948 | A1 | 9/2014 | Graylin et al. |
| 2014/0279113 | A1 | 9/2014 | Balasubramanian |
| 2014/0310113 | A1 | 10/2014 | Sengupta et al. |
| 2015/0066699 | A1 | 3/2015 | Fisher |
| 2015/0095134 | A1 | 4/2015 | Parker et al. |
| 2015/0339648 | A1 | 11/2015 | Kushevsky et al. |
| 2019/0354981 | A1 | 11/2019 | Neighman et al. |
| 2022/0058611 | A1 | 2/2022 | Lee |
| 2022/0253847 | A1* | 8/2022 | Henderson ........... G06Q 20/348 |

FOREIGN PATENT DOCUMENTS

| | | | | |
|---|---|---|---|---|
| EP | 1764 680 | A2 | 3/2007 | |
| JP | 2002-99858 | A | 4/2002 | |
| JP | 2003-150885 | A | 5/2003 | |
| JP | 2005-321873 | A | 11/2005 | |
| JP | 2009-86832 | A | 4/2009 | |
| JP | 2009-226689 | A | 10/2009 | |
| JP | 2011-197511 | A | 10/2011 | |
| JP | 2013-97657 | A | 5/2013 | |
| JP | 2013-238977 | A | 11/2013 | |
| JP | 2017-510903 | A | 4/2017 | |
| KR | 10-2011-0019887 | A | 3/2011 | |
| KR | 10-2012-0074497 | A | 7/2012 | |
| KR | 10-2012-0133706 | A | 12/2012 | |
| WO | 2011/156884 | A1 | 12/2011 | |
| WO | WO-2012011054 | A1 * | 1/2012 | ............ G06Q 20/20 |
| WO | 2014/151582 | A1 | 9/2014 | |
| WO | 2015/100385 | A1 | 7/2015 | |

OTHER PUBLICATIONS

Second Examination Report for Australian Patent Application No. 2017228647, dated Mar. 12, 2019.
Third Examination Report for Australian Patent Application No. 2017228647, dated Apr. 18, 2019.
Notice of Allowance dated Apr. 24, 2019, for U.S. Appl. No. 14/550,382, of Neighman, D., et al., filed Nov. 21, 2014.
Non Final Office Action dated May 6, 2019, for U.S. Appl. No. 15/489,700, of Lee, R., filed Apr. 17, 2017.
International Search Report and Written Opinion in International Patent Application No. PCT/US2014/026038, dated Jul. 7, 2014.
International Search Report and Written Opinion for International Patent Application No. PCT/US2014/072285, dated Mar. 31, 2015.
Extended European Search Report for European Patent Application No. 14875157.1, dated Jul. 14, 2017.
English translation of Search Report for Japanese Patent Application No. 2016-561596, dated Sep. 7, 2017.
European Search Report dated Sep. 20, 2019, in European Patent Application No. 14 875 157.1, of Lee, R., filed Dec. 23, 2014.
-inal Office Action dated Oct. 8, 2019, for U.S. Appl. No. 15/489,700, of Lee, R., filed Apr. 17, 2017.
Advisory Action dated Dec. 20, 2019, for U.S. Appl. No. 15/489,700, of Lee, R., filed Apr. 17, 2017.
Non Final Office Action dated Jan. 15, 2020, for U.S. Appl. No. 15/489,700, of Lee, R., filed Apr. 17, 2017.
Final Office Action dated Jun. 16, 2020, for U.S. Appl. No. 15/489,700, of Lee, R., filed Apr. 17, 2017.
Advisory Action dated Sep. 9, 2020, for U.S. Appl. No. 15/489,700, of Lee, R., filed Apr. 17, 2017.
Non Final Office Action dated Nov. 10, 2020, for U.S. Appl. No. 15/489,700, of Lee, R., filed Apr. 17, 2017.
Notice of Allowance dated Apr. 27, 2021, for U.S. Appl. No. 15/489,700, of Lee, R., filed Apr. 17, 2017.
First Examination Report for Australian Patent Application No. 2019240563, dated Nov. 22, 2019.

(56) References Cited

OTHER PUBLICATIONS

Non Final Office Action dated Dec. 24, 2020, for U.S. Appl. No. 16/528,383, of Neighman, D., et al., filed Jul. 31, 2019.
Final Office Action dated Jun. 18, 2021, for U.S. Appl. No. 16/528,383, of Neighman, D., et al., filed Jul. 31, 2019.
Advisory Action dated Aug. 20, 2021, for U.S. Appl. No. 16/528,383, of Neighman, D., et al., filed Jul. 31, 2019.
Summons to Attend Oral Proceedings for European Patent Application No. 14 875 157.1, mailed Jun. 24, 2020.
Examination Report No. 2 for Australian Patent Application No. 2019240563, dated Jul. 13, 2020.
Examination Report No. 3 for Australian Patent Application No. 2019240563, dated Oct. 19, 2020.
Examination Report No. 4 for Australian Patent Application No. 2019240563, dated Nov. 19, 2020.
Non Final Office Action dated Nov. 12, 2021, for U.S. Appl. No. 16/528,383, of Neighman, D., et al., filed Jul. 31, 2019.
Examination Report No. 1 for Australian Patent Application No. 2020273349, dated Dec. 14, 2021.
Examination Report No. 2 for Australian Patent Application No. 2020273349, dated Mar. 30, 2022.
Notice of Allowance dated May 5, 2022, for U.S. Appl. No. 16/528,383, of Neighman, D., et al., filed Jul. 31, 2019.
"Application programming interface—Wikipedia", XP055671378, Retrieved from the Internet URL: https://en.wikipedia.org/w/index.php?title=Application_programming_interface&oldid=587766714#API_and_protocols, on Jun. 26, 2020, pp. 1-8.
"Card Reader," FullContact Developer API, last modified on Jun. 14, 2013, Retrieved from the Internet URL: https//web.archive.org/web/20130615043655/http://www.fullcontact.com/developer/docs/card-reader, on Sep. 29, 2015, pp. 1-8.
"Secure Code FAQs," BankSA, Retrieved from the Internet URL: http://web.archive.org/web/20121005105958/https://www.banksa.com.au/online-services/security-centre/we-protect-you/banksa-secure/secure-code-faqs, on Oct. 5, 2012, p. 1.
"Square—Pay-by-Name," Pay with your phone! Square Card case frees you of credit cards, Youtube.com, Retrieved from the Internet URL: https://www.youtube.com/watch?v=d3CYigOjx8o, Posted on Sep. 7, 2011, AppJudgment, pp. 1-15.
Friedman, T.D., "The Authorization Problem in Shared Files," IBM Systems Journal, vol. 9, Issue 4, Dec. 1970, pp. 258-280.
Goode, L., "Paying With Square's New Mobile-Payments App," All Things D, Apr. 30, 2012, Retrieved from the Internet URL: http://allthingsd.com/20120430/paying-with-squares-new-mobile-payments-app/, pp. 1-6.
Grove, V. J., "How Square's New Pay-With-Your-Name System Works," Mashable, May 23, 2011, Retrieved from the Internet URL: http://mashable.com/2011/05/23/square-card-case/#_, on Sep. 10, 2014, pp. 1-17.
Grove, V. J., "Square Announces New Consumer Initiative: Pay with your name," Mashable, May 23, 2011, Retrieved from the Internet URL: http://mashable.com/2011/05/23/square-pay-with-name/, on Sep. 10, 2014, pp. 1-23.
Morrow, S. E., "Pay-by-name purchasing: changing the future of spending," Kmov.comSt.Louis, Dec. 29, 2011, Retrieved from the Internet URL: http://www.kmov.com/news/technology/Pay-by-name-purchasing-changing-the-future-of-spending-136411238.html, on Sep. 10, 2014, pp. 1-5.
Toland, M., "Software Card Emulation in NFC-enabled Mobile Phones: Great Advantage or Security Nightmare?," Fourth International Workshop on Security and Privacy in Spontaneous Interaction and Mobile Phone Use (IWSSI/SPMU), Newcastle, UK, Jun. 18, 2012, pp. 1-6.
Non Final Office Action dated Feb. 26, 2014, for U.S. Appl. No. 13/831,103, of Neighman, D., et al., filed Mar. 14, 2013.
Non-Final Office Action dated Jul. 10, 2014, for U.S. Appl. No. 14/187,049, of Lee, R., filed on Feb. 21, 2014.
Final Office Action dated Sep. 25, 2014, for U.S. Appl. No. 14/187,049, of Lee, R., filed Feb. 21, 2014.
Advisory Action dated Oct. 17, 2014, for U.S. Appl. No. 14/187,049, of Lee, R., filed Feb. 21, 2014.
Notice of Allowance dated Oct. 20, 2014, for U.S. Appl. No. 13/831,103, of Neighman, D., et al., filed Mar. 14, 2013.
Notice of Allowance dated Feb. 27, 2015, for U.S. Appl. No. 14/187,049, of Lee, R., filed Feb. 21, 2014.
Non-Final Office Action dated May 18, 2015, for U.S. Appl. No. 14/667,496, of Lee, R., filed Mar. 24, 2015.
Final Office Action dated Aug. 21, 2015, for U.S. Appl. No. 14/667,496, of Lee, R., filed Mar. 24, 2015.
Advisory Action dated Oct. 8, 2015, for U.S. Appl. No. 14/667,496, of Lee, R., filed Mar. 24, 2015.
Non-Final Office Action dated Feb. 5, 2016, for U.S. Appl. No. 14/667,496, of Lee, R., filed Mar. 24, 2015.
Non-Final Office Action dated Apr. 8, 2016, for U.S. Appl. No. 14/187,104, of Lee, R., filed Feb. 21, 2014.
Non-Final Office Action dated Jun. 1, 2016, for U.S. Appl. No. 14/667,496, of Lee, R., filed Mar. 24, 2015.
Examination Report No. 1 for Australian Patent Application No. 2014233712, dated Sep. 15, 2016.
Examination Report No. 1 for Australian Patent Application No. 2014369891, dated Nov. 3, 2016.
Examiner Requisition for Canadian Patent Application No. 2,906,524, dated Nov. 4, 2016.
Non-Final Office Action dated Dec. 7, 2016, for U.S. Appl. No. 14/187,104, of Lee, R., filed Feb. 21, 2014.
Notice of Allowance dated Dec. 9, 2016, for U.S. Appl. No. 14/667,496, of Lee, R., filed Mar. 24, 2015.
Notice of Acceptance for Australian Patent Application No. 2014369891, dated Feb. 21, 2017.
Examiner Requisition for Canadian Patent Application No. 2,935,177, dated Apr. 7, 2017.
Notice of Allowance dated Jun. 21, 2017, for U.S. Appl. No. 14/187,104, of Lee, R., filed Feb. 21, 2014.
English translation of Notification of Reasons for Refusal for Japanese Patent Application No. 2016-561596, dated Oct. 13, 2017.
Notice of Allowance for Canadian Patent Application No. 2906524, dated Nov. 16, 2017.
Non-Final Office Action dated Jan. 25, 2018, for U.S. Appl. No. 14/550,382, of Neighman, D., et al., filed Nov. 21, 2014.
Examiner Requisition for Canadian Patent Application No. 2,935,177, dated Feb. 28, 2018.
Final Office Action dated Aug. 7, 2018, for U.S. Appl. No. 14/550,382, of Neighman, D., et al., filed Nov. 21, 2014.
Examination Report No. 1 for Australian Patent Application No. 2017228647, dated Sep. 28, 2018.
English translation of Notification of Reasons for Refusal for Japanese Patent Application No. 2016-561596, dated Oct. 5, 2018.
Advisory Action dated Nov. 15, 2018, for U.S. Appl. No. 14/550,382, of Neighman, D., et al., filed Nov. 21, 2014.
Non Final Office Action dated Jan. 2, 2019, for U.S. Appl. No. 14/550,382, of Neighman, D., et al., filed Nov. 21, 2014.
English-language translation of Decision to Grant a Patent for Japanese Patent Application No. 2016-561596, dated Jan. 18, 2019.

\* cited by examiner

MOBILE DEVICE PAYMENTS

CROSS REFERENCE TO RELATED APPLICATIONS

This application is a continuation and claims priority to U.S. patent application Ser. No. 16/528,383, filed on Jul. 31, 2019, and issued on Sep. 27, 2022 as U.S. Pat. No. 11,455, 633, which is a divisional and claims priority to U.S. patent application Ser. No. 14/550,382, filed on Nov. 21, 2014, now known as U.S. Pat. No. 10,438,202, issued on Oct. 8, 2019, which is a divisional of and claims priority to U.S. patent application Ser. No. 13/831,103, filed on Mar. 14, 2013, now known as U.S. Pat. No. 8,924,259, issued on Dec. 30, 2014, the entire contents of which are hereby incorporated by reference.

TECHNICAL FIELD

This disclosure relates to processing payment transactions.

BACKGROUND

In a conventional point-of-sale electronic credit card transaction, the transaction is authorized and captured. In the authorization stage, a physical credit card with a magnetic stripe is swiped through a merchant's magnetic card reader, e.g., as part of a point-of-sale device. A payment request is sent electronically from the magnetic card reader to a credit card processor. The credit card processor routes the payment request to a card network, e.g., Visa or Mastercard, which in turn routes the payment request to the card issuer, e.g., a bank. Assuming the card issuer approves the transaction, the approval is then routed back to the merchant. In the capture stage, the approved transaction is again routed from the merchant to the credit card processor, card network and card issuer, and the payment request can include the cardholder's signature (if appropriate). The capture state can trigger the financial transaction between the card issuer and the merchant, and optionally creates a receipt. There can also be other entities, e.g., the card acquirer, in the route of the transaction. Debit card transactions have a different routing, but also require swiping of the card.

Many transactions require that the customer sign a physical receipt, electronically approve a transaction, e.g., by pressing an approve button on a user interface, electronically sign for the transaction, e.g., with a stylus or finger on an electronic signature capture device with a touch sensitive pad, or enter an authorizing personal identification number (PIN).

SUMMARY

The specification describes how a system can conduct cardless payment transactions using text messaging. A smartphone can run applications that can make cardless payment transactions possible. However, if a phone is not Internet enabled, the system can allow the phone to make cardless payment transactions using text messaging. A payment service system can receive a request to conduct a payment transaction on behalf of a merchant. The request can identify a user having a user account with the payment service system. The system can then request approval of the payment transaction by sending a text message to a mobile phone number associated with the user account. The user can approve the payment transaction by responding with a text message, allowing the payment service system to complete the payment transaction.

In general, one innovative aspect of the subject matter described in this specification can be embodied in methods that include the actions of receiving, in a server computer, from a merchant computer an indication of a payment transaction by a user associated with a mobile phone number; providing a text message to a device associated with the mobile phone number requesting approval for the payment transaction, wherein the message includes an approval code; receiving, in the server computer, a message from the device associated with the mobile phone number; determining, in the server computer, if the text message from the device associated with the mobile phone number includes the provided approval code; and obtaining account information associated with the mobile phone number, obtaining authorization for the payment transaction using the account information, and providing notification of authorization of the payment transaction to a merchant conducting the payment transaction. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The actions include providing a picture of the user associated with the mobile phone number; and receiving an indication that the merchant has verified the user using the picture. The payment transaction is associated with an online shopping cart of a merchant website. The payment transaction is associated with a point-of-sale purchase.

In general, another innovative aspect of the subject matter described in this specification can be embodied in methods that include the actions of receiving a text message from a mobile phone of a user that includes a code identifying a merchant; identifying the merchant from the code; identifying account information of the user based on a mobile phone number of the mobile phone; providing user information to a merchant computer; receiving a request to authorize a payment transaction from the merchant computer; conducting the payment transaction; obtaining authorization for the payment transaction using the account information; and providing notification of authorization of the payment transaction to the merchant. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The actions include providing a picture of the user associated with the mobile phone number; and receiving an indication that the merchant has verified the user using the picture. The payment transaction is associated with an online shopping cart of a merchant website. The payment transaction is associated with a point-of-sale purchase.

In general, another innovative aspect of the subject matter described in this specification can be embodied in methods that include the actions of receiving a first text message from a device associated with a first mobile phone number requesting a payment transaction between a first user associated with the first mobile phone number and a second user, wherein the first text message identifies the second user; identifying a second mobile phone number associated with the second user; providing a second text message to a device associated with the second mobile phone number requesting approval for the payment transaction, wherein the second text message includes an approval code; receiving a third text message from a device associated with the second mobile phone number; and if the third text message from the device associated with the second mobile phone number includes the provided approval code, obtaining account information associated with the first mobile phone number and the second mobile phone number, obtaining authorization for the payment transaction using account information associated with the first mobile phone number, and conducting the payment transaction between the first account and the second account. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The requested payment transaction is a request to charge the second user. The requested payment transaction is a request to pay the second user.

Advantages may include one or more of the following. A customer can conduct a point-of-sale electronic payment transaction with a merchant without swiping a card, and the customer can conduct the transaction without having to access his or her own wallet. The customer can conduct the cardless payment transaction without having a mobile device that is Internet or email enabled. In addition, in some implementations the customer need not interact with a point-of-sale device, e.g., need not press an approve button on a user interface of the point-of-sale device or electronically sign. Consent to a cardless payment transaction can be given by the customer at the merchant's point-of-sale device or in connection with an online shopping cart. Two users can transfer funds using only text messaging enabled mobile devices without exchanging card or other payment account information and without meeting face-to-face.

BRIEF DESCRIPTION OF THE DRAWINGS

Like reference numbers and designations in the various drawings indicate like elements.

DETAILED DESCRIPTION

As an overview, the system allows a user to conduct cardless payment transactions using a text message sent from a mobile device, e.g. a mobile phone. The system allows the user (also called a customer or payer) to purchase items from a merchant while either physically present at the merchant, e.g., at the point of sale, or online, e.g. through a merchant's website, but using a cardless payment transaction. The system also allows the user to pay or request payment from other users of the system using a cardless payment transaction.

By providing the ability to conduct cardless payment transactions using a text message, the system allows users having mobile phones with only basic text messaging capabilities to conduct cardless payment transactions. Such devices with only basic text messaging capabilities may be referred to as "feature phones" to distinguish them from "smartphones," although any device with text messaging capability can carry out cardless payment transactions in this way.

A cardless payment transaction is one where a user conducts the transaction with a merchant or another user by using a financial account without physically presenting a payment card to the merchant at the point of sale or without otherwise providing payment card information. In fact, the merchant or other user need not receive any details about the financial account, e.g., the credit card issuer, credit card number, and the like is not provided to the merchant or the other user.

From the user's perspective, the user first signs up for an account with the cardless payment system. The sign-up process requires certain information, such as information about a financial account sufficient to perform a transaction with the account. For example, if the financial account is a credit card account, then credit card information can be provided, e.g., a credit card number and an expiration date. The user can also sign up with other payment methods such as debit cards, pre-paid cards, bank accounts, or other third party financial accounts. The sign up process can also require contact information for the user, e.g., mailing address and email, and other personal identifying information, e.g., a photograph of the user. After creating an account, the user can select a merchant or another user that also has an account with the cardless payment system. The user can give consent to perform a cardless payment transaction with the merchant or other user by sending a text message that authorizes the payment transaction. After the user gives consent by text message, the merchant can, without a presentment of the physical payment card, charge (in the case of credit cards) or debit (in the case of debit cards) the user's financial account for items the user wants to buy. Because the user's payment card is already on file with the cardless payment system, the user does not need to physically present a credit card to the merchant or the other user.

Figure 1:
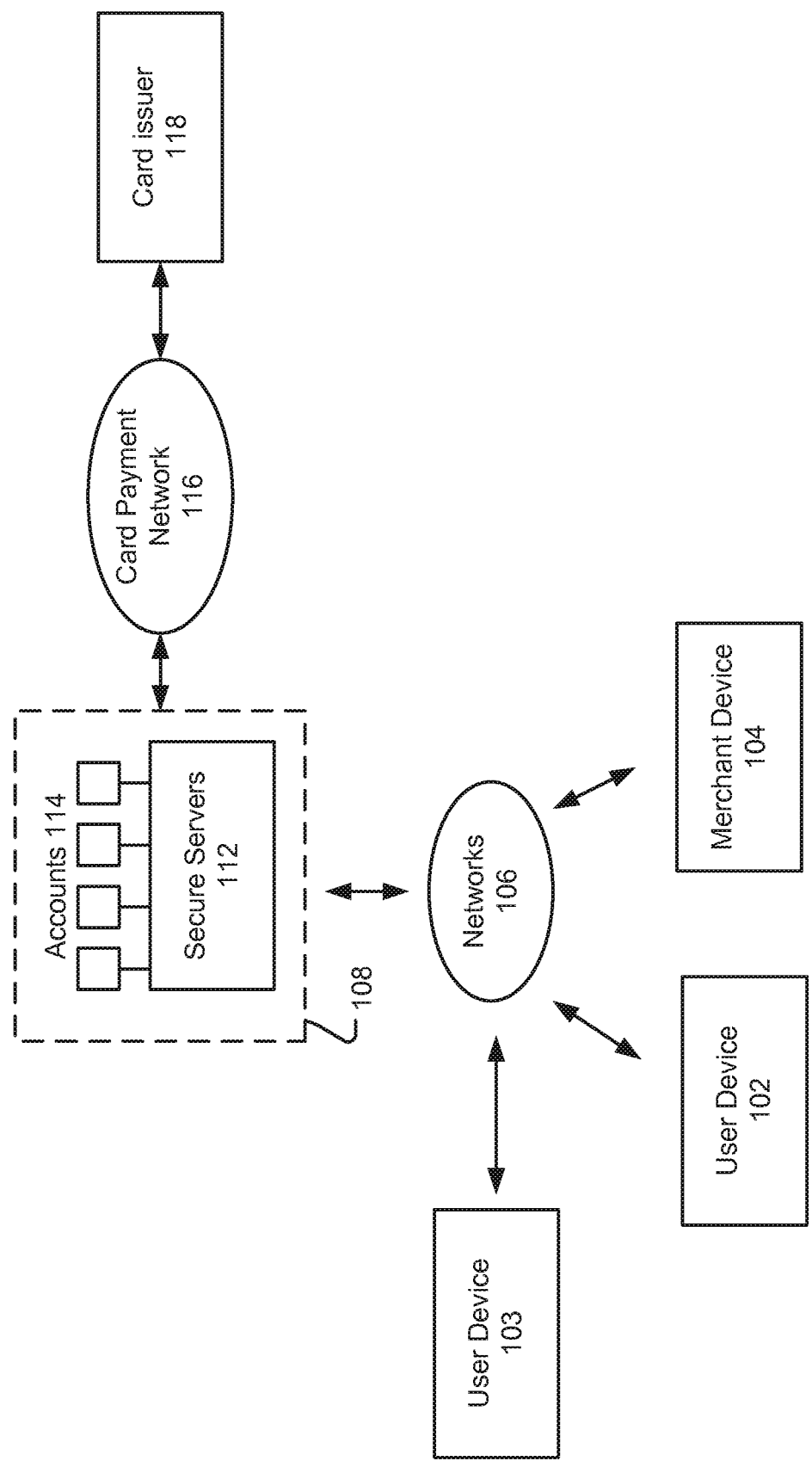
FIG. 1 is a schematic illustration of an example cardless payment system architecture.

FIG. 1 is a schematic illustration of the architecture of an example cardless payment system 100. The overall system 100 includes a user device 102, a user device 103, and a merchant device 104 connected to one or more networks 106. The user devices 102 and 103 are each a mobile device, i.e., a hand-held computing device, capable of sending a text message. For example, the user device 102 can be a feature phone, a smartphone, or a tablet computer. The merchant device 104 is also a computing device, capable of running a merchant application. The merchant device 104 can be a mobile device, a desktop computer, a tablet computer, a laptop computer, a server computer, a dedicated point of sale system, or other data processing apparatus. Using the payment service system 108, a user of user device 102 can use text messaging to conduct cardless payment transactions with either a merchant of merchant device 104 or with another user of user device 103.

The user devices 102 and 103 and the merchant device 104 can communicate with the payment service system 108 over one or more networks 106 that include mechanisms for carrying data services, e.g. text messaging services. For example, the merchant device 104 can communicate with the payment service system 108 using the Internet, while the user device 102 can communicate with the payment service system 108 using a different network, e.g. a cellular network. The networks 106 can include one or more of the Internet, a wireless local area network (WLAN), or WiFi network, a Third Generation (3G), Fourth Generation (4G), or other mobile telecommunications network, a wired Ethernet network, a private network such as an intranet, Wide Area Networks (WANs), Local Area Networks (LANs), analog or digital wired and wireless telephone networks, e.g., a Public Switched Telephone Network (PSTN), Integrated Services Digital Network (ISDN), and Digital Subscriber Line (xDSL), radio, television, cable, satellite, and/or any other delivery or tunneling mechanism for carrying data services, or any appropriate combination thereof. Networks may include multiple networks or subnetworks, each of which may include, for example, a wired or wireless data pathway.

A cardless payment processor operates a payment service system 108. The user and merchant devices can communicate with the payment service system 108 using the network 106. The payment service system 108 includes one or more servers 112, at least some of which can handle secure transactions (e.g., a secure server), to process all transactions between the user devices 102 and 103 or between a user device 102 and merchant device 104. In general, servers 112 can store public merchant information such as the merchant's address or phone number. The servers 112 can also be responsible for transferring or updating the merchant application to the merchant's computing device. The servers 112 also handle secure information such as credit card numbers, debit card numbers, bank accounts, user accounts, user-identifying information or other sensitive information.

The payment service system 108 can communicate electronically with a card payment network 116, e.g., Visa, Mastercard, or the like. The payment service system 108 can communicate with a computer system 116 of a card payment network, e.g., Visa or MasterCard. The payment service system 108 can communicate with a computer system 116 over the same network 106 used to communicate with the user device 102, or over a different network. The computer system 116 of the card payment network can communicate in turn with a computer system 118 of a card issuer, e.g., a bank. There can also be computer systems of other entities, e.g., the card acquirer, between the payment service system 108 and the card issuer.

Before a transaction between users or between a user and a merchant can be performed using the cardless payment system, each user must create a user account with the payment service system 108 and the merchant must create a merchant account with the payment service system 108.

The user can sign up using a mobile application or using an online website, and can use the mobile device 102 or another computing device, e.g., a home computer. Creation of the user account can be handled through a user application, or through another application, e.g., a generic web browser. The user enters a name, an account password, and contact information for receiving text messages, e.g., an email address or a mobile phone number. Before a transaction can be performed, the user also enters financial account information sufficient to conduct the transaction into the payment service system 108. For example, in the case of a credit card account, the user can enter the credit card issuer, credit card number and expiration date into the payment service system 108; the card validation value and mailing address may also be required. However, the financial account could also be associated with a debit card or pre-paid card, or another third party financial account.

In some implementations, the payment service system 108 requires additional personal identifying information before a transaction can be performed. For example, the payment service system 108 may require a photo of the user before a transaction can be performed. The photo of the user would be provided to the merchant so that the merchant can compare the photo to the person. In addition, the payment service system 108 can require a personal identification number (PIN) be entered by the user. Other requirements can also be added to increase security. The data associated with a user account 114 can be stored at the servers 112, e.g., in a database.

The merchant can sign up for an account using the merchant device 104 or another device. The merchant enters a name, account password, and contact information, e.g., email address, and physical location information, e.g., an address, into the payment service system 108. The merchant can also provide other information, e.g., a list of goods or services available, operating hours, phone number, a small identifying image logo or mark, to the payment service system 108. The data associated with the merchant account 114 can be stored at the servers 112, e.g., in a database.

At some point prior to the transaction, a merchant application is downloaded to the merchant device 102, e.g., through an application store. Creation of the merchant account can be handled through the merchant application, or through another application, e.g., a generic web browser.

Eventually, in order to receive funds from the transaction, the merchant will need to enter financial account information into the payment service system sufficient to receive funds. For example, in the case of a bank account, the user can enter the bank account number and routing number. However, the merchant's financial account can also be associated with a credit card account or another third party financial account. In addition, in some implementations, if the merchant has not entered the financial account information, the cardless payment processor can hold the received funds until the financial account information is provided.

Figure 2:
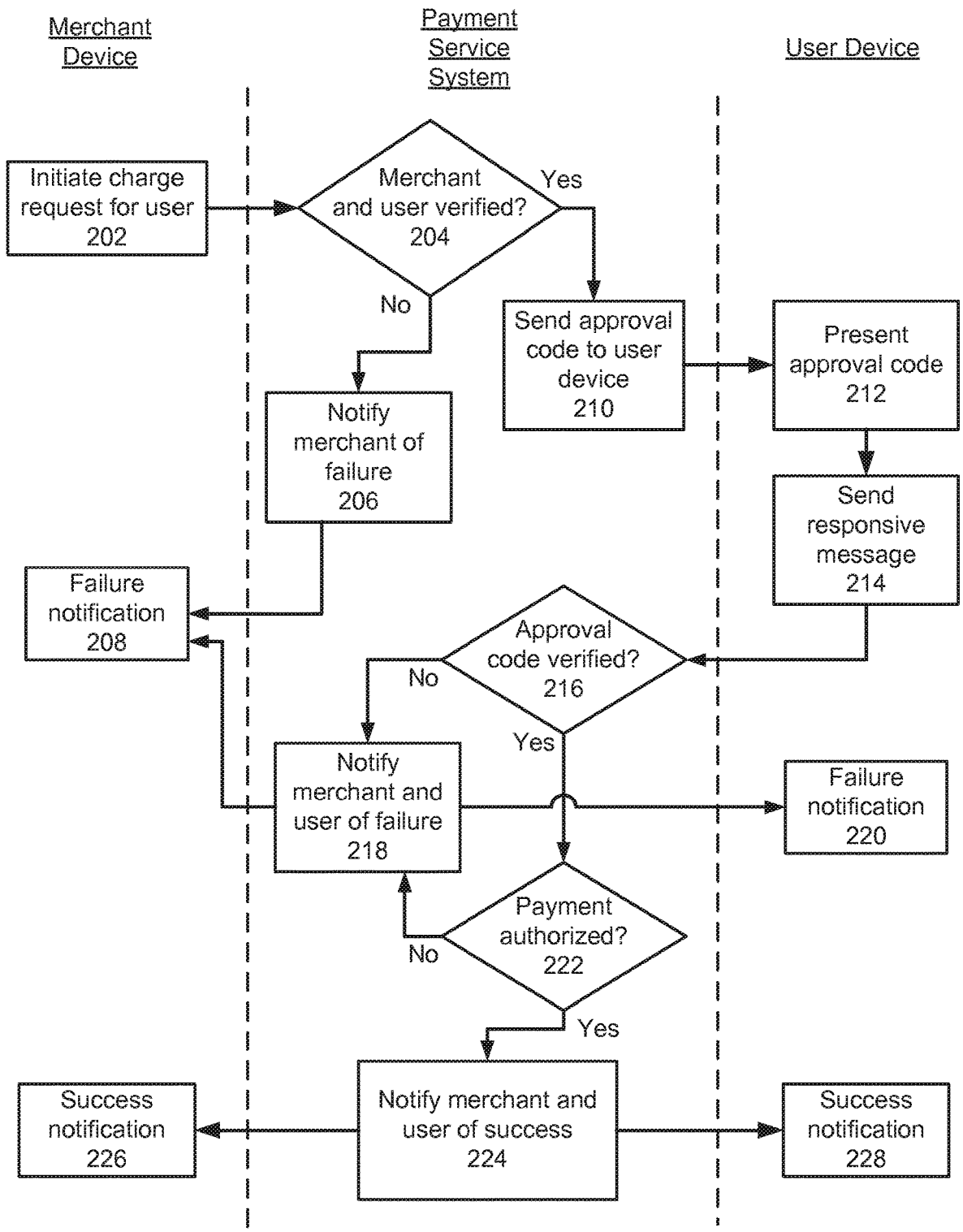
FIG. 2 is a sequence diagram that illustrates conducting a cardless payment transaction between a merchant device and a user mobile device using text messaging.

FIG. 2 is a sequence diagram that illustrates conducting a cardless payment transaction between a merchant device and a user mobile device using text messaging. In general, a merchant device initiates a purchase transaction to a payment service system. The payment service system sends a text message to a user device asking the user to approve the transaction. The user responds with a second text message in order to approve or deny the purchase transaction.

For example, the user can enter the merchant's place of business and select items for purchase. As another example, the user can visit the merchant's website and select items for purchase in a virtual online shopping cart. Rather than relying on a payment card, the user can provide the merchant with information identifying her account with a payment service system, for example, by providing a phone number, an email address, or a user identifier.

Using this identifying information, the merchant device initiates a charge request for the user to the payment service system (202). In general, the merchant device can communicate with the payment service system using any appropriate data communications network, e.g. the Internet. In some implementations, the user can enter his or her own phone number into a user interface of the merchant device. Alternatively, the user can tell the merchant his or her phone number and the merchant can enter the phone number into a user interface of the merchant device.

The payment service system receives the charge request and determines whether the merchant and the user are verified (204). For example, the system can determine whether both the merchant and the user have verified accounts with the payment service system. This can include verifying that the user account is associated with a phone number of the user device and verifying that the user account and the merchant account are properly set up for payment transactions.

If either the merchant or the user does not have a verified account, the payment service system notifies the merchant device that the transaction has failed (branch to 206). The merchant device can then provide a failure notification to the merchant (208).

If the merchant and user both have verified accounts, the payment service system can send an approval code to the user device (210). In general, the payment service system can send the approval code to the user device by sending a text message to a phone number associated with the user account. Using text messaging allows the payment service system to provide an approval code to even devices that may not be Internet or email enabled, e.g. some feature phones. The payment service system can send the approval code using any appropriate messaging protocol, e.g. text messaging using Short Message Service (SMS) protocol or text messaging using a dedicated messaging application.

For point-of-sale transactions, the payment service system can also require the merchant to verify the user's identity, either before or after sending the approval code to the user device. After the payment service system receives the indication that both the merchant and the user have verified accounts, the payment service system can send personal identifying information to the merchant device. In some implementations, personal identifying information includes the user's name and a picture of the user. Upon receipt of this information, the merchant device can display the user's identifying information on the graphical user interface (GUI) of the merchant application. In some implementations, through the GUI of the merchant application, the merchant can select items that the user has sought to purchase. The application can be configured to associate individual prices with each of the merchant's items, and the application can automatically sum the total transaction amount that the user owes. In some implementations, the merchant can enter into the application a total sum of prices for all the items the user wishes to purchase, as well as tax or tip. Before or after the user authorizes payment for the transaction, the merchant verifies the user's identity. In some implementations, the merchant ensures that the image displayed on the merchant device matches the user who is present at the point of sale. Assuming that the image matches, the merchant selects the transaction using the GUI of the merchant application. In some implementations, the merchant can ask the user for more identifying information before processing the transaction such as the user's birthday, address, or other personal identifying information. After verifying the user's identity, the merchant interfaces with the merchant application to continue processing the transaction, e.g. by sending the approval code to the user device (210).

The user device presents the approval code to the user (212). The approval code can be presented as part of a text message that includes instructions for approving the payment transaction. In some implementations, the text message identifies the merchant and the amount of the purchase transaction. For example, the text message can be "Respond to this message with 'yes' to approve your purchase of $7.89 at Joe's Sub Shop." In this example, the approval code, "yes," if received by the payment service system, indicates that the user has approved the purchase transaction. The approval code can be any combination of alphanumeric or other characters supported by the particular text messaging protocol being used. For increased security, for example, the approval code can be a random or pseudorandom string of letters.

The user device sends a responsive message to the payment service system (214). The user device can for example repeat the approval code in a text message to the payment service system. The user can send a responsive text message by replying to the phone number of the original received text message that included the approval code. The user can decide to either approve the transaction or void the transaction by providing the appropriate approval code to the payment service system. For example, if the amount of the payment transaction initiated by the merchant is too high, the user can decline the transaction by sending a text message with an approval code that does not match.

The payment service system determines whether the approval code is verified (216). For example, the payment service system determines whether the responsive text message includes the approval code provided to the user device. The payment service system can also use additional logic to determine whether the approval code is verified. For example, the payment service system can require that the approval code text message be received within a particular amount of time after sending the approval code, e.g. within 10 minutes.

If the approval code is not verified, the payment service system can notify the merchant and the user that the transaction has failed (branch to 218). The payment service system can notify the merchant and the user using different communications protocols. For example, the payment service system can notify the merchant using Internet communications, while the payment service system can notify the user using a text message. If the transaction fails, the user device can display a notification that the transaction has failed (220), for example, by presenting a text message with the failure notification.

If the approval code is verified, the payment service system can continue to process the payment transaction and determine whether payment is authorized (branch to 222). For example, the payment service system can obtain the user's account information and communicate with a card payment network to request authorization for the transaction. If the payment is not authorized, the payment service system can notify the merchant and the user that the transaction has failed (branch to 218).

If the payment was authorized, the payment service system can notify the merchant and the user of success (branch to 224) and will pay out the request. For example, the payment service system can send the merchant device an indication of success, and the merchant device can display a success notification (226). The payment service system can send the user device a text message indicating that the payment transaction was successful and the user device can notify the user of success by presenting the text message (228).

Figure 3:
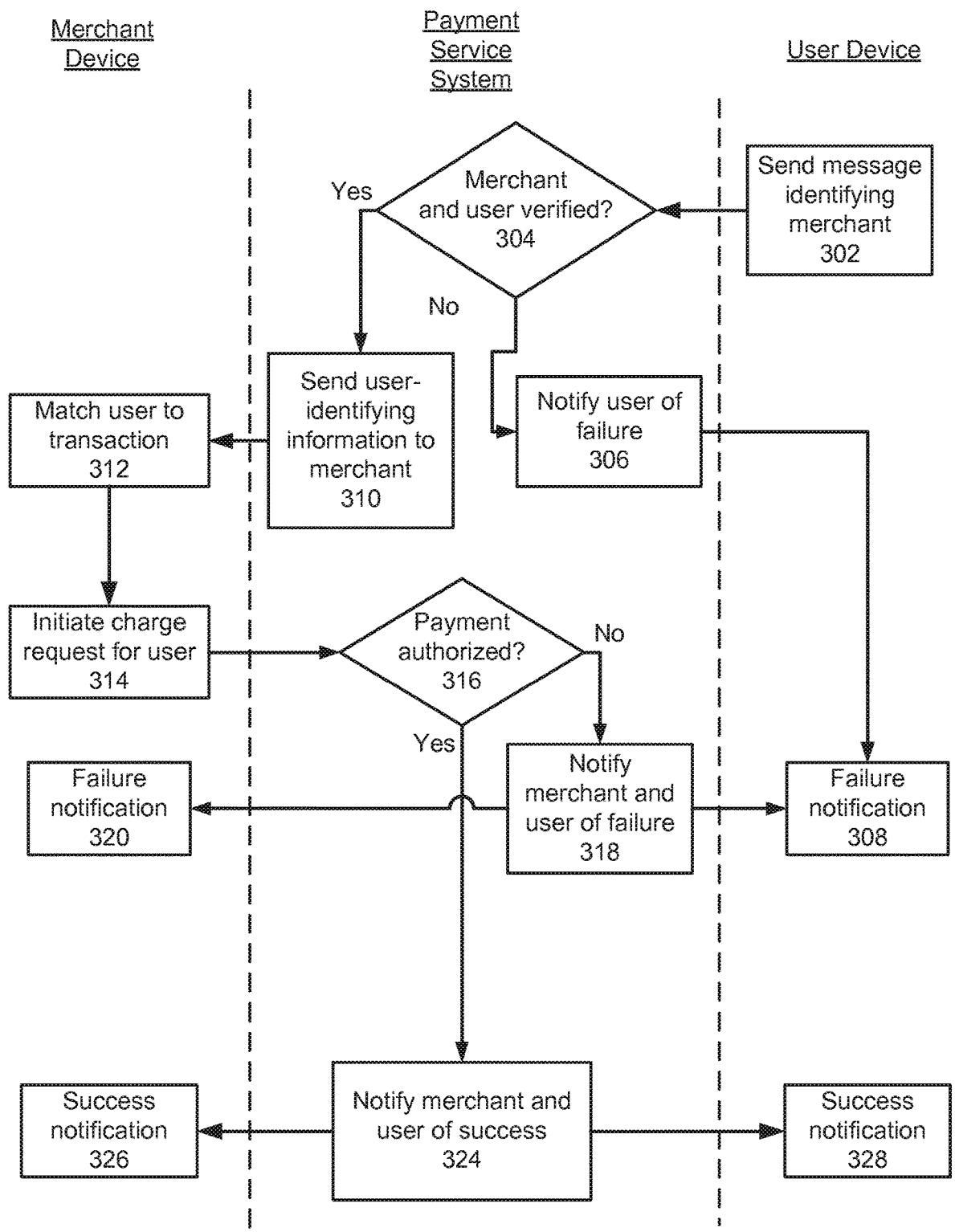
FIG. 3 is a sequence diagram that illustrates conducting a cardless payment transaction between a merchant device and a user mobile device using text messaging.

FIG. 3 is a sequence diagram that illustrates conducting a cardless payment transaction between a merchant device and a user mobile device using text messaging. In this example, the purchase transaction is initiated by a text message from the mobile device, rather than being initiated by the merchant device.

For example, the user can enter the merchant's place of business and select items for purchase. As another example, the user can visit the merchant's website and select items for purchase in a virtual online shopping cart. Rather than relying on a payment card, the user can initiate the purchase transaction by sending a message to the payment service system that identifies the merchant (302). For example, the user device can send a text message to a dedicated phone number associated with the payment service system, for which the system treats incoming text messages as requests to initiate a payment transaction. A user can identify the merchant with a text message, for example, by including the merchant's phone number, an email address, a merchant identifier, or some other information that identifies the merchant in the content of the text message. The payment service system can parse the content of a received text message to extract the merchant identifier and can identify the merchant using the identifier. To assist customers in being able to identify a merchant, the merchant can, for example, display a merchant code at the point-of-sale or on the merchant's website. The user can then include the merchant code in the content of a text message and send the text message the dedicated phone number of the payment service system to initiate the transaction.

The payment service system determines whether the merchant and the user are verified (304). For example, the system can determine whether both the merchant and the user have verified accounts with the payment service system. The payment service system can identify the user account using the phone number associated with the received text message.

If either the merchant or the user does not have a verified account, the payment service system notifies the user device that the transaction has failed (branch to 306). For example, the payment service system can send a text message to the user device indicating that the transaction has failed. The user device can then provide a failure notification to the user, e.g. by presenting the text message (308).

If the merchant and user both have verified accounts, the payment service system can send user-identifying information to the merchant (310). For example, the payment service system can provide a phone number, an email address, or a user identifier so that the merchant can match the user to an appropriate purchase transaction. For point-of-sale transactions, the payment service system can additionally provide a picture of the user to the merchant device so that the merchant can verify the identity of the user initiating the purchase transaction.

The merchant matches the user to a transaction (312). For example, the merchant can use the merchant application to sum the total transaction amount that the user owes. The merchant can then attempt match the transaction with one or more possible users whose user-identifying information is displayed on the interface of the merchant device. For example, for point-of-sale transactions, the merchant can match the transaction to a user by asking the user for user-identifying information, e.g. his or her name, phone number, or some other identifier. For online transactions, the merchant's website can ask the user to enter user-identifying information and use the entered information to match the user to a transaction.

If the merchant cannot locate user information that matches the information that the user provided, the merchant can cancel the transaction. Additionally, if a picture of the user provided by the payment service system does not match the appearance of the user attempting to initiate the transaction, the merchant can cancel the transaction.

After identifying the transaction, the merchant initiates a charge request to the payment service system for the user (314). The payment service system can then obtain the user's account information to request authorization for the payment transaction (316). For example, the payment service system can communicate with a card payment network for the user to request authorization for the transaction.

If the payment transaction was not authorized, the payment service system can notify the merchant and the user that the transaction has failed (branch to 318). As discussed above with reference to FIG. 2, the payment service system can notify the merchant and the user using different communications protocols. For example, the payment service system can notify the merchant device by using the Internet, causing the merchant application on the merchant device to notify the merchant of the failure (320). The payment system can send a text message to the user device to notify the user that the transaction has failed (308).

If the payment transaction was authorized, the payment service system can notify the merchant and the user of success (branch to 324) and will pay out the request. For example, the payment service system can send the merchant device an indication of success, and the merchant device can display a success notification (326). The payment service system can send the user device a text message indicating that the payment transaction was successful and the user device can notify the user of success by presenting the text message (328).

Figure 4:
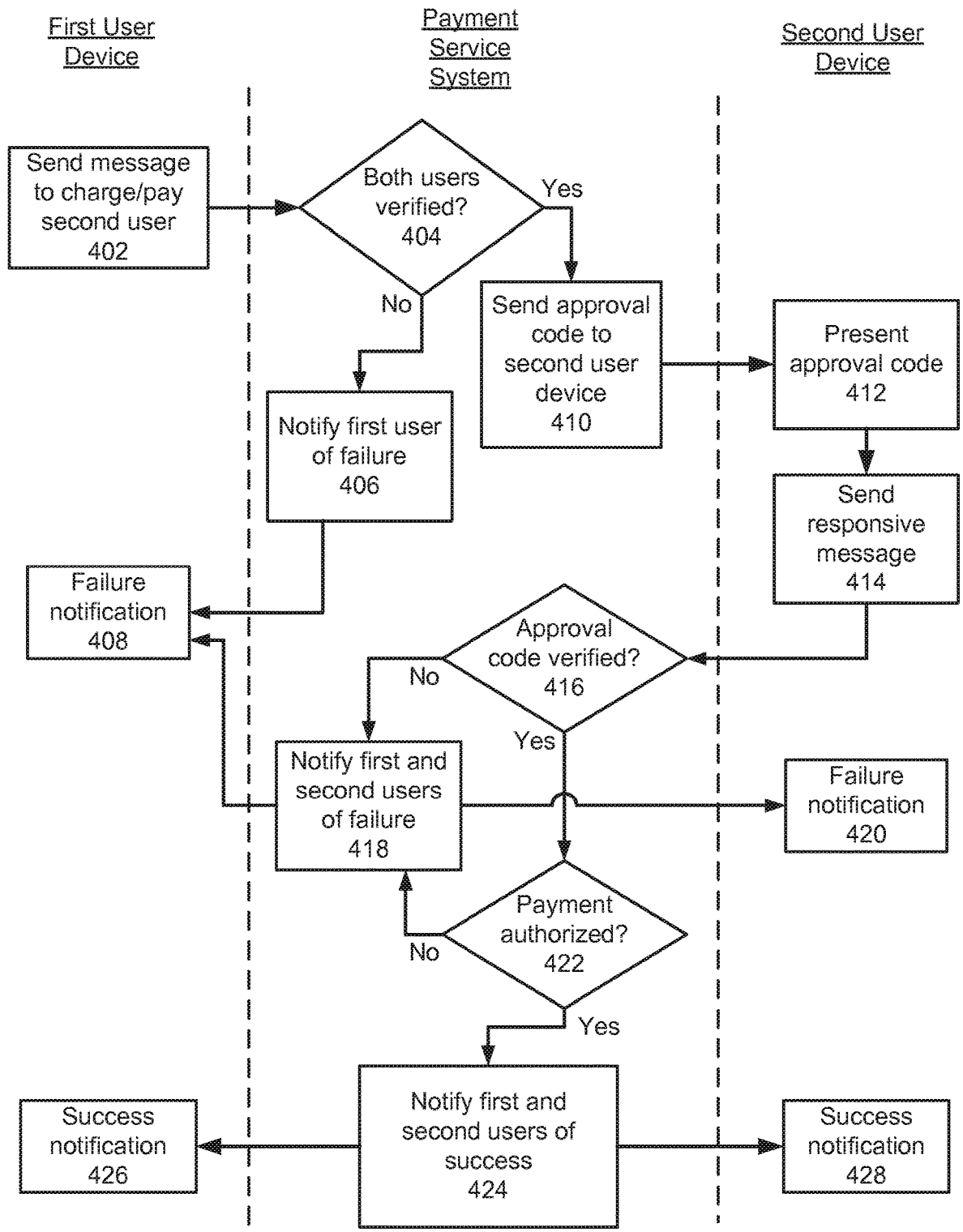
FIG. 4 is a sequence diagram that illustrates conducting a cardless payment transaction between a two user devices using text messaging.

FIG. 4 is a sequence diagram that illustrates conducting a cardless payment transaction between a two user devices using text messaging. In this example, the purchase transaction is initiated by a text message from a first user device and an approval code is presented to a second mobile device in order to approve the transaction.

The first user device sends a message to the payment service system to charge or pay a second user (402). The first user device can for example send a text message to a phone number associated with the payment service system for which the system treats incoming text messages as requests to initiate a payment transaction. The first user can identify the second user with a text message, for example, by including a phone number, an email address, a user identifier, or some other uniquely identifying information of the second using in the content of the text message. The content of the text message can also include an amount of the purchase transaction to charge the second user. The system can parse the content of the received text message to extract the identifier of the second user and the amount of the purchase transaction.

The payment service system verifies that both users have accounts in the system (404). The payment service system can identify the first user using a phone number associated with the initiating text message. If either of the users does not have a verified account, the payment service system notifies the first user that the transaction has failed, for example, by sending a text message to the first user device explaining that the transaction failed and why (branch to 406). The first user device can present the text message indicating failure on the user device (408).

If both users have verified accounts, the payment service system can send an approval code to the second user device (branch to 410). The payment service system can send a text message including an approval code to a phone number associated with the account of the second user, and the second user device presents the approval code in the text message to the user (412), for example, as described above with reference to FIG. 2. The text message can also identify the first user and include the amount of the proposed transaction.

The second user device sends a responsive message to the payment service system (414). For example, if the second user wants to approve the proposed transaction, the second user can repeat the approval code in a responsive text message to the payment service system. On the other hand, the second user does not want to approve the proposed transaction, the second user can send a responsive text message to the payment service system that does not include the approval code.

The payment service system determines whether the approval code is verified (416). For example, the payment service system can determine whether the responsive text message includes the approval code provided to the second user device and whether the responsive text message was received within a threshold amount of time.

If the approval code is not verified, the payment service system can notify both the first user and the second user that the transaction has failed (branch to 418). For example, the payment service system can notify both the first user and the second user by sending a text message to each user device notifying the first user (408) and the second user 420) that the transaction has failed.

If the approval code is verified, the payment service system can continue to process the payment transaction. For example, the payment service system can communicate with a respective card payment network for the first user and the second user to request authorization for the payment transaction.

The payment service system can then determine whether the payment transaction is authorized (branch to 422). If the payment is not authorized, the payment service system can notify the first user and the second user that the transaction has failed (branch to 418).

If the payment transaction was authorized, the payment service system can notify the first user and the second user of success (branch to 424) and will pay out the request. For example, the payment service system can notify both the first user and the second user by sending a text message to each user device notifying the first user (426) and the second user (428) that the transaction has succeeded.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, at one or more computing devices of a payment service and in association with a transaction between a customer and a merchant, a message from a computing device of the customer, wherein the message includes data obtained via an optical scan of a code by the computing device of the customer, wherein the code is displayed at a point-of-sale of the merchant or a website of the merchant;
   receiving, by the one or more computing devices of the payment service and from an application executing on a computing device of the merchant, a request to authorize payment for the transaction;
   identifying, by the one or more computing devices of the payment service, a customer account of the customer and a merchant account of the merchant based on the message received from the computing device of the customer;
   accessing, by the one or more computing devices of the payment service, and based on identifying the customer account of the customer, payment data previously associated with the customer account;
   authorizing, by the one or more computing devices of the payment service, the payment using the payment data previously associated with the customer account; and
   providing, by the one or more computing devices of the payment service, notification of the authorization of the payment to the application executing on the computing device of the merchant or an application executing on the computing device of the customer.

2. The computer-implemented method as claim 1 recites, wherein the data comprises a merchant identifier.

3. The computer-implemented method as claim 1 recites, wherein the merchant account comprises financial account information associated with the merchant.

4. The computer-implemented method as claim 1 recites, wherein the one or more computing devices of the payment service process the payment without (i) the payment data being read from a payment instrument at a time of the transaction or (ii) the payment data being input by the customer at the time of the transaction.

5. The computer-implemented method as claim 1 recites, wherein the message includes an amount of the payment.

6. The computer-implemented method as claim 1 recites, wherein the request to authorize the payment includes an indication that the merchant has verified an identity of the customer.

7. The computer-implemented method as claim 1 recites, wherein the message comprises a first message, and the method further comprising:
   sending, by the one or more computing devices of the payment service, a request for approval of the payment to the computing device of the customer; and
   receiving, by the one or more computing devices of the payment service, a second message from the computing device of the customer approving the payment,
   wherein authorizing the payment is based at least in part on receiving the second message.

8. The computer-implemented method as claim 7 recites, further comprising:
   determining, by the one or more computing devices of the payment service, that the request for approval and the second message were received within a threshold period of time of each other,
   wherein authorizing the payment is further based at least in part on the determining that request for approval and the second message were received within a threshold period of time of each other.

9. A system comprising:
   one or more processors;
   one or more non-transitory computer-readable media storing computer-executable instructions that, when executed, cause the one or more processors to perform operations comprising:
      receiving, at one or more computing devices of a payment service and in association with a transaction between a customer and a merchant, a message from a computing device of the customer, wherein the message includes data obtained via an optical scan of a code by the computing device of the customer, wherein the code is displayed at a point-of-sale of the merchant or a website of the merchant;
      receiving, by the one or more computing devices of the payment service and from an application executing on a computing device of the merchant, a request to authorize payment for the transaction;
      identifying, by the one or more computing devices of the payment service, a customer account of the customer and a merchant account of the merchant based on the message received from the computing device of the customer;
      accessing, by the one or more computing devices of the payment service, and based on identifying the customer account of the customer, payment data previously associated with the customer account;
      authorizing, by the one or more computing devices of the payment service, the payment using the payment data previously associated with the customer account; and
      providing, by the one or more computing devices of the payment service, notification of the authorization of the payment to the application executing on the computing device of the merchant or an application executing on the computing device of the customer.

10. The system as claim 9 recites, wherein the transaction is conducted via the website of the merchant.

11. The system as claim 10 recites, wherein the one or more computing devices of the payment service cause display of the code on the website of the merchant.

12. The system as claim 9 recites, wherein the transaction is conducted at the point-of-sale of the merchant.

13. The system as claim 12 recites, wherein the payment service causes display of the code on a point-of-sale device at the point-of-sale of the merchant.

14. The system as claim 9 recites, wherein the message comprises a first message, and the operations further comprising:
   sending, by the one or more computing devices of the payment service, a request for approval of the payment to the computing device of the customer;
   receiving, by the one or more computing devices of the payment service, a second message from the computing device of the customer approving the payment; and
   determining, by the one or more computing devices of the payment service, that the request for approval and the second message were received within a threshold period of time of each other,
   wherein authorizing the payment is based at least in part on the determining that the request for approval and the second message were received within a threshold period of time of each other.

15. The system as claim 9 recites, further comprising:
   sending, by the one or more computing devices of the payment service and to the computing device of the merchant, an indication of receipt of the message from the computing device of the customer,
   wherein receiving the request to authorize the payment is at least partly responsive to sending the indication of the receipt.

16. The system as claim 9 recites, wherein receiving the message from the computing device of the customer is at least partly responsive to receiving, by the one or more computing devices of the payment service and from the computing device of the merchant, the request to authorize the payment.

17. One or more non-transitory computer-readable media storing computer-executable instructions that, when executed by one or more processors, cause the one or more processors to perform operations comprising:
   receiving, at one or more computing devices of a payment service and in association with a transaction between a customer and a merchant, a message from a computing device of the customer, wherein the message includes data obtained via an optical scan of a code by the computing device of the customer, wherein the code is displayed at a point-of-sale of the merchant or a website of the merchant;
   receiving, by the one or more computing devices of the payment service and from an application executing on a computing device of the merchant, a request to authorize payment for the transaction;

identifying, by the one or more computing devices of the payment service, a customer account of the customer and a merchant account of the merchant based on the message received from the computing device of the customer;

accessing, by the one or more computing devices of the payment service, and based on identifying the customer account of the customer, payment data previously associated with the customer account;

authorizing, by the one or more computing devices of the payment service, the payment using the payment data previously associated with the customer account; and providing, by the one or more computing devices of the payment service, notification of the authorization of the payment to the application executing on the computing device of the merchant or an application executing on the computing device of the customer.

18. The one or more non-transitory computer-readable media as claim 17 recites, wherein the message comprises a first message, and the operations further comprising:

sending, by the one or more computing devices of the payment service, a request for approval of the payment to the computing device of the customer; and receiving, by the one or more computing devices of the payment service, a second message from the computing device of the customer approving the payment, wherein authorizing the payment is based at least in part on receiving the second message.

19. The one or more non-transitory computer-readable media as claim 18 recites, further comprising:

determining, by the one or more computing devices of the payment service, that the request for approval and the second message were received within a threshold period of time of each other, wherein authorizing the payment is based at least in part on the determining that request for approval and the second message were received within a threshold period of time of each other.

20. The one or more non-transitory computer-readable media as claim 17 recites, wherein identifying the customer account based on the message comprises identifying the customer account based at least in part on a customer identifier associated with the application executing on the computing device of the customer.

* * * * *